May 29, 1962 H. K. SCHILLING 3,036,667
FRICTION BRAKES
Filed Feb. 9, 1959

INVENTOR,
HUGH K. SCHILLING.

BY *Robert M. Dunning*
ATTORNEY

United States Patent Office 3,036,667
Patented May 29, 1962

3,036,667
FRICTION BRAKES
Hugh K. Schilling, St. Paul, Minn., assignor to Horton Manufacturing Co., Inc., St. Paul, Minn., a corporation of Minnesota
Filed Feb. 9, 1959, Ser. No. 792,033
1 Claim. (Cl. 188—75)

This invention relates to friction brakes and deals particularly with a type of brake designed to resist the rotation of a rotating member such as a roller, shaft, drum or the like.

A brake of the type disclosed in this application is primarily designed to control the speed of a rotatable member rather than to cause intermittent complete stoppage of the rotation of the member. For example, in the process of weaving cloth on looms, the parent roll or beam of wrap threads are stored on various sizes of rollers or shafts. In order that threads being weaved by shuttles will be interwoven evenly and at regularly spaced intervals it is essential that a constant tension be maintained on the warp threads. This can only be accomplished by providing some form of braking action directly to the rollers carrying the warp threads. Furthermore, the brake must be capable of supplying varying degrees of braking action upon the roller since as the thread supply on the rollers decreases, the speed of the parent roller increases.

With these thoughts in mind, this invention contemplates a friction brake adapted to be readily installed on an exposed end of a shaft, or upon a drum or similar rotatable member and which is actuated by air or another suitable fluid through the use of a conventional diaphragm.

It is, therefore, the primary object of this invention to provide a friction brake having a pair of brake shoes loosely mounted in diametric relation about a rotatable member. The shoes are provided with liners made of a suitable heat resisting material and are directly engageable with the surface of the rotatable member. The brake shoes are properly supported in transverse alignment with a rotatable member and are supported for transverse movement toward and away from a rotatable member.

A feature of the present invention resides in the provision of means for preventing the brake from rotating about the axis of a rotatable member. One of the shoes is provided with a bifurcated tab adapted to receive a pin or similar protrusion extending from a fixed frame which normally supports the rotatable member.

A further feature of the present invention resides in the provision of a diaphragm engageable with the brake shoes to apply pressure to one brake shoe in a direction to force it against the rotatable member, and means connecting the diaphragm to the other brake shoe to cause the brake shoes to be drawn towards each other and into engagement with the surface of a rotatable member.

Another feature of this invention lies in the provision of the type of control means such as a fluid actuated diaphragm which permits a predetermined pressure to be applied to the brake to control the amount of pressure directed to the brake shoes which subsequently provides the desired amount of friction to control the speed of the roller or rotatable member.

An additional feature of this invention resides in the provision of a brake which may be readily applied and removed from a rotatable member. In such instances as when the brake is applied to rollers containing a quantity of warp threads for looms weaving cloth or when rollers are frequently removed or interchanged, it is essential that the brakes be of the type which can be speedily removed and subsequently replaced on a newly installed roller.

These and other objects and features will appear from the following specification taken in connection with the drawings wherein.

Figure 1:
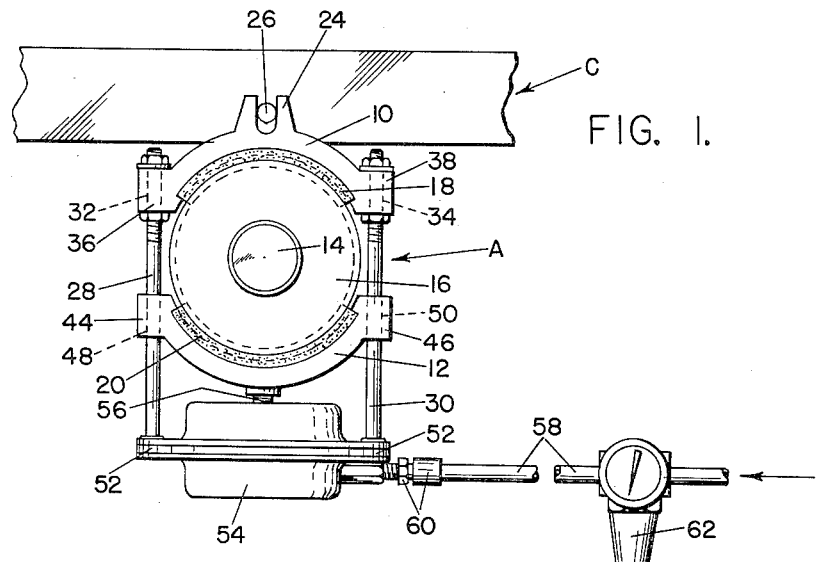
FIGURE 1 is an end elevational view showing the general disposition of the brake in relation to a rotatable member.

As was previously stated the brake in its present form has many uses. For purposes of presentation in this application the brake will be described in connection with rollers used in the process of weaving cloth.

Warp threads or the basic threads used to form the foundation of cloth are normally stored on parent rollers which in turn are positioned adjacent the shuttling apparatus of looms. The warp threads are pulled off the parent roller upon which they are stored and are fed through the loom. The shuttles weaving cross threads are strategically located so as to weave the cloth which will result in the production of cloth which is evenly and smoothly cross woven with the warp threads. In order that the cross weave is accomplished regularly and evenly it is essential that the tension of the warp threads be maintained constant and adequate to allow each cross thread to be woven a specific and equal distance from the last woven cross thread. Therefore, a certain degree of resistance must be supplied to the parent roller housing the warp threads because the momentum of a roller housing a quantity of threads has a tendency to cause some slack in the warp threads being fed to the shuttling area.

Furthermore, as the warp threads are drawn from the parent roller and the diameter of the roll of thread decreases, the roller tends to turn faster with less of a torque arm and consequently less resistance is needed to retard its momentum. It is therefore necessary that the type of brake used be provided with means for regulating the braking action delivered to the roller.

The brake is indicated in general by the letter A and is shown mounted on a roller indicated by the letter B. Although it is not shown in the drawings it will be understood that the roller B is properly supported and carried by the frame generally indicated by the letter C.

The brake includes a pair of arcuate brake shoes 10 and 12 which are disposed diametrically about the roller B transversely thereto and in overlying relation to each other. For purposes of clarity, in explanation the shoe 10 will hereafter be called the upper shoe and the shoe 12 the lower shoe.

The roller B may be a shaft of equal diameter throughout or it may be provided with a stub shaft 14 upon which is mounted a drum 16. The drum insures that the brake shoes remain in axial alignment with respect to the drum and roller.

The brake shoes are provided with liners 18 and 20 engageable with the surface 22 of the drum. In actual use the drum 16 may be omitted and the brake shoe liners may directly engage the surface of the roller or stub shaft.

The brake shoe 10 is provided with a bifurcated tab 24 adapted to receive therein a pin 26 which extends from the fixed frame C. It will be seen that the shoes are free to move transversely toward and away from the roller but is prevented from rotating about the axis of the roller.

A pair of spaced parallel rods 28 and 30 are provided having their upper ends inserted through apertures 32 and 34 disposed through projections 36 and 38 formed integrally with the shoe 10. Opposing nuts 40 and 42 lock the ends of the rods in place. The shoe 12 is movable toward and away from the roller by providing it with integrally formed projections 44 and 46 having apertures 48 and 50 through which the rods 28 and 30 extend.

Figures 2, 3:
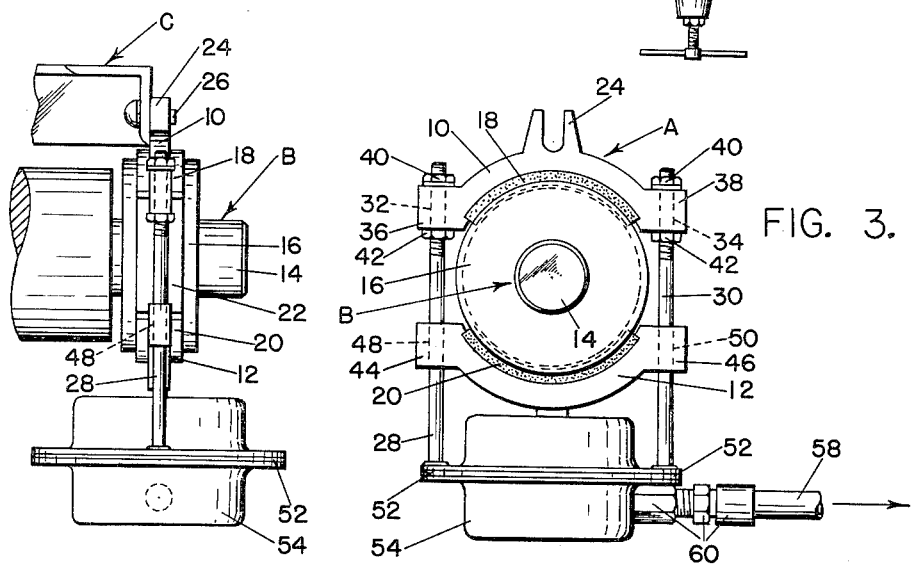
FIGURE 2 is a side elevational view of the brake as shown in FIGURE 1, certain portion of a roller.
FIGURE 3 is a view similar to FIGURE 1 showing the brake in a non-engaged position.

The lower ends of the rods are fixed to a circular flange 52 on the housing of a diaphragm 54. The diaphragm 54 is provided with a stem 56 which projects from the housing and is connected to the shoe 12 intermediate its projected ends 44 and 46. Upon expansion of the diaphragm the shoe 12 is forced against the drum or roller as best seen in FIGURE 1. Simultaneously the shoe 10 is urged against the roller. As seen in FIGURE 3 when the diaphragm is contracted the shoe 12 is moved away from the roller. Since the brake is "free floating" the shoe 10 will always ride on the roller carrying the weight of the brake in its entirety. However since the brakes are used primarily on rollers which are slow turning, and as during use the brake is normally at least partially applied, the accumulation or dissipation of friction heat is not a critical factor.

The interior of the diaphragm 54 has not been illustrated as various types of structures are available for this purpose. The diaphragm is so arranged that when air or hydraulic fluid is applied through the conduit 58 and suitable connections 60 the stem 56 is forced outwardly from the diaphragm casing to engage the shoe 12 as was heretofore described.

A control valve 62 may be positioned at a convenient point along the length of the conduit. This valve is adapted to enable an operator to manually control the fluid pressure thereby permitting varying degrees of braking action upon the roller.

From the foregoing specification it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded unnecessary.

Changes in shape, size, and arrangement of details and parts such as come within the purview of the invention claimed may be resorted to in actual practice, if desired.

I claim:

A brake for use in resisting rotation of a rotatable member, the brake including a pair of arcuate brake shoes loosely mounted in diametric relation about a rotatable member, means connected thereto for holding said brake shoes from rotation about the axis of a rotatable member including a frame member having a pin fixed thereto and a bifurcated tab extending from one of said shoes forming a slot for the slidable reception of said pin therein, means for supporting said brake shoes in transverse alignment with the rotatable member including a pair of guide rods parallel to each other and to said slot, said one of said brake shoes being affixed to the ends of said rods nearest said tab and the other of said shoes being constrained for sliding movement along said rods, brake liners within said arcuate brake shoes engageable with the rotatable member, fluid actuated means connected to the other ends of said rods and engageable with the central portion of said other brake shoe for applying braking pressure to said shoes, and conduit means including a control valve therein for supplying a controlled amount of fluid under pressure to said fluid actuated means, whereby when one of said brake shoes is urged toward the rotatable member said brake shoes will be urged toward each other in unison thereby resisting rotation of the rotatable member.

References Cited in the file of this patent
UNITED STATES PATENTS

| | | |
|---|---|---|
| 1,383,325 | Maschek et al. | July 5, 1921 |
| 1,444,979 | Meyer | Feb. 13, 1923 |
| 1,914,366 | Franzen | June 20, 1933 |
| 2,391,724 | Martin et al. | Dec. 25, 1945 |
| 2,548,008 | Franklin | Apr. 10, 1951 |
| 2,903,099 | Nelson | Sept. 8, 1959 |